H. RUTHARDT.
SHAFT COUPLING.
APPLICATION FILED OCT. 23, 1911.

1,047,841.

Patented Dec. 17, 1912.

Witnesses.

Inventor.

UNITED STATES PATENT OFFICE.

HERMANN RUTHARDT, OF STUTTGART, GERMANY.

SHAFT-COUPLING.

1,047,841. Specification of Letters Patent. Patented Dec. 17, 1912.

Application filed October 23, 1911. Serial No. 656,274.

*To all whom it may concern:*

Be it known that I, HERMANN RUTHARDT, a subject of the German Emperor, residing at Stuttgart, in the German Empire, have invented a new and useful Improved Shaft-Coupling, of which the following is a specification.

The present invention relates to an improved shaft coupling having means whereby two shaft members rotating together can automatically be angularly displaced relatively to each other in accordance with their speed.

The device can be applied to governors in general, but is specially adapted for magneto-electric igniters on internal combustion engines, for the purpose of automatically varying the time of ignition under varying speeds of the motor shaft. As compared with the known devices for this purpose, in which a displacement is brought about between the armature shaft of the igniter and the shaft of the internal combustion engine by means of rotary weights controlled by springs, the new device presents the advantage that the relative displacement of the two rotary members is effected by an entirely compulsory movement of the rotating weights, without the use of springs; consequently, the risk of disturbance due to the weakening of the springs, or to friction or jamming that the springs cannot overcome, is reliably prevented. These advantages are secured in the new device by connecting up the rotating weights as a coupling member between the driving and the driven members, this connection being made in such a way that the said weights apply themselves on the one hand against a race in the driving member and on the other against a race in the driven member. The races provided in the two members may be either straight or curved, but must be arranged slantwise in relation to each other in such a way that the peripheral forces acting on the rotating weights tend to push these weights toward the axis of rotation against the centrifugal force. At the same time the new device presents the advantage that the members effecting the displacement can be housed in a casing which is interposed, like a coupling, between the driving and the driven shafts. Hence the device can also be applied to existing igniters of any type.

Typical forms of the new device are shown in the accompanying drawings, in which—

Figure 1:
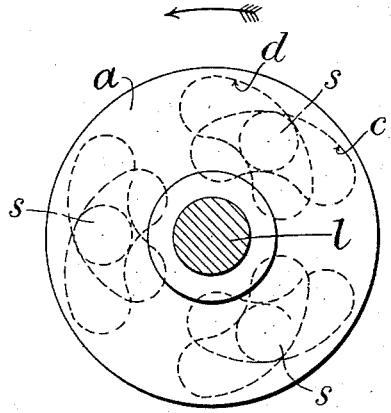
Figure 3:
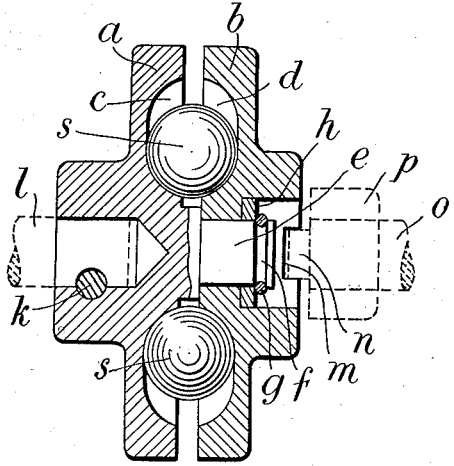
Figure 2:
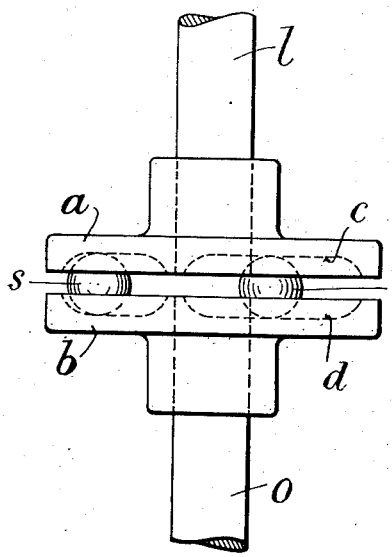
Figure 4:
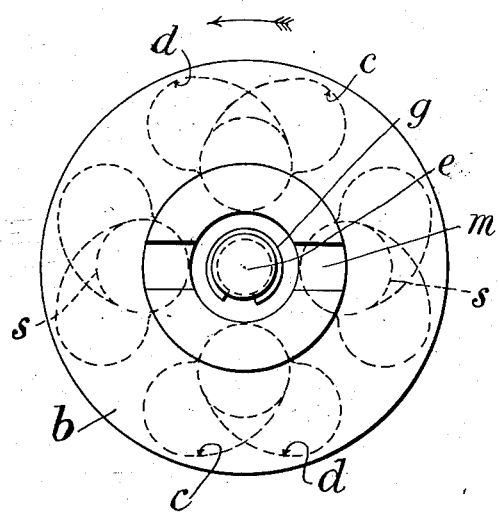

Figure 1 is a front elevation of one form, and Fig. 2 a side elevation of same viewed from the right hand side of Fig. 1; and Fig. 3 is a section, and Fig. 4 a side elevation of another embodiment of the invention.

Referring to the example shown in Figs. 1 and 2, the centrifugal weights $s$ are here provided in triplicate and comprise balls which are guided in slots $c$ in the one rotary member $a$, and in slots $d$ in the other rotary member $b$.

In the other example, namely the one shown in Figs. 3 and 4, four centrifugal balls $s$ $s$ are employed. In both examples the slots $c$ and $d$ are arranged slantwise or helically, in relation to each other, so that when the member $b$ is rotated slowly in the direction of the arrow, the balls $s$ move inward up to the ends of the slots. Consequently, the member $b$ carries the member $a$ with it, through the intermediary of the balls. When the speed is increased, the balls effect a relative angular displacement of the driven member $a$, by being themselves forced outward until equilibrium is established between the pressures, exerted by the walls of the slots $c$ $d$ on the balls, and the centrifugal force acting radially outward.

By suitably shaping the slots $c$ and $d$ (that is to say, the races) for the rotating weights, the relative displacement or lost motion of the driving and driven members while rotating can be regulated as desired. Owing to the slightness of the friction between the balls $s$ and the races of the driving and driven members, no injurious wear of the device is to be feared. The compulsory moving of the balls also prevents any interruption to the working; and as the balls or rollers are merely dropped in loosely, the device can be easily taken apart.

In order to enable the device to be conveniently applied to existing igniters, the relatively rotatable members $a$ and $b$ may, as shown in Figs. 3 and 4, be combined as a self-contained casing, by mounting the one member rotatably on the other. In the form shown, the member $b$ is, for example loosely mounted on a gudgeon-like extension $e$ of the member $a$. A split spring $g$ lying in a groove $f$ in this extension and pressing against the disk $h$, prevents the separation of the two members $a$ and $b$ in the axial direction. In inserting the device into position, all that is then necessary is to connect the two members $a$ and $b$ of the coupling casing with the armature shaft of the igniter and the motor shaft, or a shaft operated by same. In the drawing for example, the member $a$ is connected with the shaft $l$ (indicated by dotted lines) by means of a pin $k$, while the member $b$ is provided with a slot $m$ in which engages the spring $n$ of a coupling member $p$ secured on the shaft $o$ (indicated by dotted lines). This method of connection permits a certain amount of radial play, for the contingency of the shafts $l$ and $o$ not being exactly in a straight line. Or, where convenient the two members $a$ and $b$ may be mounted fast on their respective shafts before the latter are brought together. This form of arrangement is exemplified in Fig. 2.

In the following claims it is to be understood that where the word "recess" occurs it is used in its widest sense and includes any sort of recess that is suitable for the purpose herein set forth, however formed, whether a groove, channel, depression, rabbet, or slot. Similarly, the word "inclined" as applied to such recess is used in the broad sense as including any departure from the radial that is suitable for the purpose herein set forth.

What I claim as my invention, and desire to secure by Letters Patent, is:—

1. In a shaft coupling the combination of a coupling member having an end face provided with an elongated recess, a complementary coupling member also having an end face provided with an elongated recess or depression adapted to partially register with the aforesaid recess or depression in the first named coupling member, said recesses or depressions being so pitched relatively to each other that they cannot register or coincide with each other for their whole length at any one time, and a rigid body lying loosely in the co-registering portions of the recesses or depressions.

2. In a shaft coupling the combination of a pair of complementary coupling members each having an end face provided with a recess adapted to partially register with a corresponding recess or depression in the opposing end face of the other, one of said recesses or depressions being so pitched as to diverge from the corresponding one for a portion of its length when brought into operative relation thereto, and a loose key member adapted to lie slidably between said complementary coupling members and to project partly into a recess or depression of each.

3. In a shaft coupling the combination of mutually complementary coupling members having coacting faces each provided with a plurality of keyways at angular intervals which correspond in the coacting faces, and a plurality of slidable key members each adapted to lie partly in a keyway in one coupling member and partly in a keyway in the other coupling member, said keyways being adapted to register each with its companion keyway at one distance from the axis of the coupling and at the same time to be out of register therewith at another distance from said axis.

4. In a shaft coupling the combination of mutually complementary coupling members having co-acting faces each provided with a guideway, a guideway in one member being adapted to register or coincide with a guideway in the other member at one part of its length and at the same time to depart from register or coincidence therewith at another part of its length, and a centrifugal body common to said partially registering guideways.

5. In a shaft coupling the combination of mutually complementary coupling members having co-acting faces each provided with a guideway, a guideway in one of said members being adapted always to be partially in register and partially out of register with a guideway in the other member when the parts are assembled, and a loose centrifugal ball adapted to lie partly in one guideway and partly in the opposite guideway.

6. In a shaft coupling the combination of mutually complementary coupling members having co-acting faces each provided with a plurality of guideways at angular intervals which respectively correspond in the co-acting faces, a plurality of slidable centrifugal bodies or masses each adapted to lie partly in a guideway in one coupling member and partly in the corresponding guideway in the other coupling member, said guideways being adapted to register each with its corresponding or companion guideway at one distance from the axis of the coupling and at the same time to be out of register therewith at another distance from said axis.

7. In a shaft coupling the combination of mutually complementary coupling members having co-acting faces each provided with a guideway, each of said guideways being inclined relatively to the companion guideway, and a slidable centrifugal mass or body adapted to lie partly in one guideway and partly in the companion guideway.

8. In a shaft coupling the combination of mutually complementary coupling members having co-acting faces each provided with a plurality of guideways which respectively correspond in the co-acting faces, each of said guideways being inclined relatively to the companion guideway in the opposite face, and a plurality of centrifugal slidable masses or bodies each adapted to lie partly in a guideway in one face and partly in the companion guideway in the other face.

9. In a shaft coupling the combination of mutually complementary coupling members having co-acting faces each provided with a guideway, each of said guideways being inclined relatively to the companion guideway, a slidable centrifugal mass or body adapted to lie partly in one guideway and partly in the companion guideway, and means for connecting said coupling members together against relative longitudinal displacement while permitting of relative angular displacement.

10. In a shaft coupling the combination of mutually complementary coupling members having co-acting faces each provided with a guideway, each of said guideways being inclined relatively to the companion guideway, a slidable centrifugal mass or body adapted to lie partly in one guideway and partly in the companion guideway, and a gudgeon-like projection on one of said faces adapted to carry the other coupling member, the latter having in its face a recess or depression adapted to fit over said gudgeon-like projection.

11. In a shaft coupling the combination of mutually complementary coupling members having co-acting faces each provided with a plurality of guideways which respectively correspond in the co-acting faces, each of said guideways being inclined relatively to the companion guideway in the opposite face, a plurality of centrifugal slidable masses or bodies each adapted to lie partly in a guideway in one face and partly in the companion guideway in the other face, and means such as a central male and female inter-engagement to hold said coupling members together while permitting of relative angular motion between them.

12. In a shaft coupling the combination of mutually complementary coupling members having co-acting faces each provided with a guideway, each of said guideways being inclined relatively to the companion guideway, a slidable centrifugal mass or body adapted to lie partly in one guideway and partly in the companion guideway, means for securing one of said coupling members fast on a shaft and means for detachably connecting the other coupling member to a shaft.

13. In a shaft coupling the combination of a plurality of shaft members, mutually complementary coupling members having co-acting faces each provided with a guideway, each of said guideways being inclined relatively to the companion guideway, a slidable centrifugal mass or body adapted to lie partly in one guideway and partly in the companion guideway, one of said coupling members being fixed to the corresponding shaft member while the other coupling member is detachably connected to its shaft member by a tongue on the one engaging in a groove in the other.

14. In a shaft coupling the combination of mutually complementary coupling members having co-acting faces each provided with a plurality of guideways which respectively correspond in the co-acting faces, each of said guideways being inclined relatively to the companion guideway in the opposite face, a plurality of centrifugal slidable masses or bodies each adapted to lie partly in a guideway in one face and partly in the companion guideway in the other face, one of said coupling members being adapted to be permanently secured to a shaft or shaft member and the other coupling member being adapted to be detachably secured to a shaft or shaft member.

15. The combination with a motor shaft and a magneto shaft, of a pair of heads fixed on the ends of the shafts and facing each other, and having oppositely curved grooves in their adjacent faces, and rolling members in said grooves for coupling the heads together adapted to be thrown outwardly by centrifugal force to advance the magneto shaft.

16. In a device of the character described, the combination of two shafts in alinement, a head fixed on each shaft, said heads each being provided with a series of grooves in the faces thereof, those on the driving head being arranged so as to extend outwardly at an angle to the radius and forwardly with respect to the rotation of the driving shaft and those on the driven head rearwardly, and balls in said grooves for transmitting a motion of rotation from one to the other.

In witness whereof I have hereunto set my hand in the presence of two subscribing witnesses.

HERMANN RUTHARDT.

Witnesses:
ERNST PAUL WUNTER,
HERMANN HERRE.